United States Patent Office 3,359,109
Patented Dec. 19, 1967

3,359,109
LEUCO DYE - N,N,O - TRIACYLHYDROXYL-
AMINE LIGHT-SENSITIVE DYE FORMER
COMPOSITIONS
Robert Junior Harder and Charles Yembrick, Jr., Wilmington, Del., assignors to E. I. du Pont de Nemours and Company, Wilmington, Del., a corporation of Delaware
No Drawing. Filed Apr. 29, 1964, Ser. No. 363,594
7 Claims. (Cl. 96—90)

ABSTRACT OF THE DISCLOSURE

A composition of (1) the leuco form of a dye having removable hydrogen and (2) an N,N,O-triacylhydroxylamine. A representative composition is an aminotriarylmethane and N,N,O-triacetylhydroxylamine. The compositions can be irradiated with light of wavelengths between 2000–4200 A. whereupon the leuco dye is converted to its colored form.

---

This invention is directed to novel light-sensitive compositions and to an inventive process for forming a colored material from an essentially colorless one by irradiation with ultraviolet light. More particularly, the present invention encompasses a composition comprising an intimate admixture of the leuco form of a dye and a triacylhydroxylamine. Upon irradiation with a pattern of ultraviolet light, this composition quickly undergoes a color change to form significantly a sharp image. The triacylhydroxylamines utilized are N,N,O-triacylhydroxylamines.

Image-forming compositions and processes play an essential part in photography, thermography, and related arts dealing with processes of writing, printing, and producing images with the aid of light, heat, electricity, or combinations of these activating influences. Currently available methods of image production impose numerous limitations which are costly, inconvenient, time-consuming, and sometimes potentially hazardous. Classical photography, for example, although efficient in employing light energy, uses expensive chemicals and papers, involves multi-step processing and drying, and requires a highly skilled operator for consistently good results.

Thermography requires less operator skill and less expensive papers than photography, but produces less well-defined images which are easily destroyed. Mechanical printing, while inexpensive and rapid for repetitive copying, is decidedly more expensive and slow for sequential copying. In any event, mechanical printing yields a wet image. Presently available photochemical image-forming systems involve the use of toxic chemicals such as ammonia, cyanide derivatives, halohydrocarbons, and caustic materials. A new printing or imaging system which overcomes some of the limitations and difficulties of the existing systems would significantly advance the art and be desirable.

It is, therefore, an object of this invention to provide a novel composition sensitive to ultraviolet light and capable of forming a permanent color when irradiated. Another object is to provide a composition which forms a permanent colored image when irradiated in a graphic pattern. A further object is to provide a photosensitive paper which can be imaged by irradiation with light in a graphic pattern.

This invention also has the object of providing a novel process for forming a colored material from an essentially colorless one by irradiation with ultraviolet light.

These and other objects of the invention will become apparent from the following description and claims.

More specifically, the present invention is directed to light-sensitive compositions comprising an intimate admixture of (1) a dye in the leuco form represented by $DH_n$ wherein the radical D represents a dye precursor and H represents a hydrogen atom, the removal of which forms a dye, D, differently colored than $DH_n$ and $n$ is one of the integers 1 and 2 (2) an N,N,O-triacylhydroxylamine wherein the N,N-acyl groups may form with the nitrogen atom an imide ring, with the proviso that the N,N,O-triacylhydroxylamine and the leuco dye produce color when about 10 mg. of each of these compounds are mixed together in 10 ml. of a 50:50 mixture of ethanol and N,N-dimethylformamide in a quartz vessel and irradiated with light of a wavelength from about 2000 A. to about 4200 A. Preferred embodiments include a light-sensitive product comprising a supporting base carrying a radiation-sensitive composition as heretofore described; paper treated with said composition and a polymer matrix containing such a composition.

A preferred embodiment for forming a colored material consists of irradiating the light-sensitive composition embodiments heretofore described with light having a wavelength from about 2000 A. to about 4200 A.

A preferred composition is one in which the leuco dye is tris(4-diethylamino-o-tolyl)methane or salt thereof and the N,N,O-triacylhydroxylamine is N,N,O-triacetylhydroxylamine.

Another preferred composition is one in which the leuco dye is a triarylmethane containing at least two p-dialkyl-amino-substituted phenyl groups having as a substituent ortho to the methane carbon atom an alkyl, alkoxy or halogen. An alternate and preferred embodiment is this leuco triarylmethane dye in intimate mixture with N,N,O-triacetylhydroxylamine.

The leuco form of a dye which may compose the light-sensitive composition of the invention is the dye in the reduced form having one or two hydrogen atoms, the removal of which together with one or two electrons produces the dye. Since the leuco form of the dye is essentially colorless, or in some instances it may be of a different color or of a less intense shade than the parent dye, it provides a means of producing an image when the leuco form is oxidized to the dye. This oxidation is accomplished in the invention by irradiation of an intimate admixture of the leuco form of the dye with a triacylhydroxylamine with ultraviolet light in the range of wavelength from about 2000 to about 4200 A.

The exact mechanism of the photooxidation of the leuco dye in the presence of the triacylhydroxylamine is perhaps not fully understood. The following mechanism, to which we refer as an acceptor mechanism, is proposed, but the invention gives the results stated whether or not this is the true theory involved. According to the acceptor mechanism the photooxidant (A–A′) serves as an "acceptor" of an electron ejected by the color generator (DH) to effect an irreversible color-forming reaction giving the dye D+. Such a photooxidant generally absorbs none of the activating light. If it does absorb some of the activating radiation, the absorption is dissipated in a non-color-forming manner and does not lead to color generation. The activating radiation is, instead, absorbed by the color generator to produce a photo-excited molecule (D*H) which then undergoes an oxidation-reduction reaction with the acceptor photooxidant. In this process, the photo-excited leuco dye molecule donates an electron to the acceptor molecule. The resultant ion radical is then converted to the dye. A possible sequence of reactions may be represented schematically as follows:

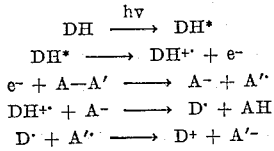

When mixed with a triacylhydroxylamine, as defined herein, a large number of dyes in the leuco form have been found to be readily converted to the parent dye by irradiation with ultraviolet light of wavelength from about 2000 A. to about 4200 A. by the above-described mechanism and are well adapted to provide new and useful image-forming compositions. Dyes in the leuco form which are operative according to the invention include:

(A) Aminotriarylmethanes, such as bis(p-benzylethylaminophenyl)(o-chlorophenyl)methane,
bis(p-dimethylaminophenyl)(4-dimethylamino-1-naphthyl)methane,
bis(p-dimethylaminophenyl)(1,3,3-trimethyl-2-indolinylidenemethyl)methane, and
bis(p-dipropylaminophenyl)(o-fluorophenyl)methane.

Because of their superior resistance to color development due to air oxidation, the preferred species of aminotriarylmethanes contain at least two p-dialkylamino-substituted phenyl groups having as a substituent ortho to the methane carbon atom an alkyl, alkoxy or halogen. Specific examples of these preferred species include:

bis(4-dimethylamino-o-tolyl)(2-chlorophenyl)methane,
bis(4-diethylamino-2-methoxyphenyl)(4-nitrophenyl)methane,
tris(4-diethylamino-2-chlorophenyl)methane,
bis(4-dimethylamino-o-tolyl)(2-bromophenylmethane),
bis(4-diethylamino-o-tolyl)(4-benzylthiophenyl)methane, and
bis(4-diethylamino-o-tolyl)(2-thienyl)methane.

(B) Aminoxanthenes, such as 3-amino-6-dimethylamino-2-methyl-9-(o-chlorophenyl)xanthene,
3,6-bis(diethylamino)-9-(o-chlorophenyl)xanthene,
3,6-bis(dimethylamino)-9-(o-methoxycarbonylphenyl)xanthene.

(C) Aminothioxanthenes, such as 3,6-bis(dimethylamino)-9-(o-methoxycarbonylphenyl)thioxanthene,
3,6-dianilino-9-(o-ethoxycarbonylphenyl)thioxanthene.

(D) Amino-9,10-dihydroacridines, such as 3,6-bis(benzylamino)-9,10-dihydro-9-methylacridine,
3,6-diamino-9-hexyl-9,10-dihydroacridine.

(E) Aminophenoxazines, such as 5-benzylamino-9-diethylamino-benzo[a]phenoxazine, and
3,7-bis(diethylamino)phenoxazine.

(F) Aminophenothiazines, such as 3,7-bis(dimethylamino)-4-nitrophenothiazine,
3,7-bis[N-ethyl-N-(m-sulfobenzyl)amino]phenothiazine, monosodium salt, and
3,7-diaminophenothiazine.

(G) Aminodihydrophenazines, such as 3,7-bis(benzylethylamino)-5,10-dihydro-5-phenylphenazine,
3,7-bis(dimethylamino)-5-(p-chlorophenyl)-5,10-dihydrophenazine,
3,7-diamino-5,10-dihydro-5-methylphenazine, and
3,7-diamino-5,10-dihydro-2,5,8-trimethylphenazine.

(H) Aminodiphenylmethanes, such as 1,4-bis[bis(p-diethylaminophenyl)methyl]piperazine,
bis(p-diethylaminophenyl)-1-benzotriazolylmethane,
bis(p-diethylaminophenyl)(2,4-dichloroanilino)methane,
bis(p-diethylaminophenyl)(octadecylamino)methane, and
1,1-bis(p-dimethylaminophenyl)ethane.

(I) Aminohydrocinnamic acids (cyanoethanes), such as $\alpha$-cyano-4-dimethylaminohydrocinnamamide,
$\alpha,\beta$-dicyano-4-dimethylaminohydrocinnamamide,
$\alpha,\beta$-dicyano-4-(p-chloroanilino)hydrocinnamic acid, methyl ester,
p-(2,2-dicyanoethyl)-N,N-dimethylaniline, and
p-(1,2,2-tricyanoethyl)-N,N-dimethylaniline.

(J) Leucoindigoid dyes, such as 7,7'-diamino-5,5'-dichloroleucothioindigo,
6,6'-dichloro-4-methylleucothioindigo,
7,7'-dimethylleucoindigo,
5,5'-disulfoleucoindigo, disodium salt, and
5,5',7,7'-tetrachloroleucoindigo.

(K) 1,4-diamino-2,3-dihydroanthraquinones, such as 1,4-bis(ethylamino)-2,3-dihydroanthraquinone,
1-amino-4-methoxyanilino-2,3-dihydroanthraquinone,
1,4-diamino-2,3-dihydroanthraquinone,
1-p-(2-hydroxyethylamino)anilino-4-methylamino-2,3-dihydroanthraquinone.

(L) 1,4-bis(4,5-diaryl-2-imidazolyl)benzenes, such as 1,4-bis(4,5-diphenyl-2-imidazolyl)benzene,
1,4-bis[4,5-bis(p-methoxyphenyl)-2-imidazolyl]benzene,
1,4-bis[4,5-bis(o-chlorophenyl)-2-imidazolyl]benzene,
1,4-bis[4-(p-methoxyphenyl)-5-phenyl-2-imidazolyl]benzene.

(M) Hydroxyphenyldiarylimidazoles, such as 2-(p-hydroxyphenyl)-4,5-diphenylimidazole,
2-(3,5-dibromo-4-hydroxyphenyl)-4,5-diphenylimidazole,
2-(3,5-dichloro-4-hydroxyphenyl)-4,5-diphenylimidazole,
2-(4-hydroxy-3,5-dimethoxyphenyl)-4,5-diphenylimidazole,
2-(3,5-dibromo-2-hydroxyphenyl)-4,5-diphenylimidazole,
4-(4-hydroxyphenyl)2,5-diphenylimidazole, and
2-(4-hydroxy-3,5-dimethoxyphenyl)-4,5-bis(p-methoxyphenyl)imidazole.

Of the above leuco forms of dyes, A through H form the dye by losing one hydrogen atom, while the leuco forms I through M lose two hydrogen atoms to produce the dye.

With the leuco form of dyes which have amino or substituted amino groups within the dye structure a mineral acid, organic acid, or an acid from an acid-supplying compound is preferably employed to achieve highest optical density. The amount of acid may vary from 0.33 mole to 1.5 moles per mole of amino nitrogen in the dye. The preferred quantity of acid is about 1 mole per mole of amino nitrogen. Acid in large excess of that required to form a salt with the amino nitrogen should be avoided because it may render the composition less light-sensitive. Representative acids which form the required amine salts are hydrochloric, hydrobromic, sulfuric, nitric, phosphoric, acetic, oxalic, and p-toluenesulfonic. Other acids such as acids in the "Lewis" sense or acid sources which may be employed in the presence of water or moisture include zinc chloride, zinc bromide, and ferric chloride.

Representative N,N,O - triacylhydroxylamines which may be used as photooxidants in the light-sensitive composition of the invention include:

N,N,O-triacetylhydroxylamine,
N,N,O-tripropionylhydroxylamine,
N,N,O-tributyrylhydroxylamine,
N,N,O-tristearoylhydroxylamine, N,N,O-tribenzoylhydroxylamine,
N,N,O-tris(m-chlorobenzoyl)hydroxylamine,
N,N,O-tris(p-methylbenzoyl)hydroxylamine,
N,N,O-tris(o-propionylbenzoyl)hydroxylamine,
N,N-diacetyl-O-butyrylhydroxylamine,
N,N-diacetyl-O-benzoylhydroxylamine,
N,N-diacetyl-O-naphthoylhydroxylamine,
N,N-dibutyryl-O-acetylhydroxylamine,
N,N-dibenzoyl-O-acetylhydroxylamine,
N,N-dibenzoyl-O-(p-methylbenzoyl)hydroxylamine,
N,O-diacetyl-N-butyrylhydroxylamine,
N,O-diacetyl-N-benzoylhydroxylamine, and
N,O-dipropionyl-N-caproylhydroxylamine.

The N,N-acyl groups of an N,N,O-triacylhydroxylamine of the invention may form with the nitrogen atom an imide ring. The resultant N-acyloxyimide is a type of N,N,O-triacylhydroxylamine that may be used in the light-sensitive composition and is viewed as coming within the scope of the invention. Representatives of such an N-acyloxyimide include:

N-acetoxy-2,3-dimethylsuccinimide,
N-benzoyloxysuccinimide,
N-acetoxyglutarimide,
N-acetoxy-2-dodecylglutarimide,
N-butyryloxy-2,3-dimethylmaleimide,
N-(p-chlorobenzoyloxy)maleimide,
N-acetoxyphthalimide,
N-butyryloxyphthalimide,
N-benzoyloxyphthalimide,
N-(p-methylbenzoyloxy)phthalimide,
N-benzoyloxy-p-chlorohomophthalimide, and
N-propionyloxy-2,3-naphthalimide.

The above N,N,O-triacylhydroxylamines are prepared by well-known reactions involving the interaction of an acid anhydride or acid halide with hydroxylamine or the acylation of a diacylhydroxylamine. The foregoing N-acyloxyimides are prepared by reacting an acid anhydride or acid halide with an N-hydroxyamide or by treating an acid anhydride or ester of a dibasic acid with hydroxylamine followed by acylation.

Operable compositions of the above defined leuco dyes and an N,N,O-triacylhydroxylamine photooxidant as illustrated by the above groups of compounds are observed and identified in the following way. About 10 mg. of both the leuco dye and the N,N,O-triacylhydroxylamine (or N-acyloxyimide) are added to about 10 ml. of a solution of equal parts by volume of ethanol and N,N-dimethylformamide contained in a quartz vessel. The solution is stirred to ensure that at least a portion of each of the added solid materials dissolves. The solution is then irradiated with light having a wavelength from about 2000 A. to about 4200 A. The formation of an intense color in the solution indicates a light-sensitive composition.

Other solvents and combinations of solvents may be used. Solvents which are inert toward the leuco form of the dye and the N,N,O-triacylhydroxylamine are usually employed to dissolve these components and thereby mix them together and to provide a fluid medium for a convenient and ready application of the light-sensitive composition to substrates. It is preferable to have at least 0.5% by weight of the solvent retained by such a substrate as paper to ensure optimum image formation upon radiation with ultraviolet light. It is not necessary that the substrate be wet with solvent, humidified, or specially handled. In general, a preferred solvent has a boiling point of at least 60° C. at atmospheric pressure. Solvents with high boiling points that are not readily removed by evaporation may be used when their quantity is restricted as it can be in mixtures with other solvents having relatively high vapor pressures. Representative solvents which may be employed are formamide, N,N-dimethylformamide, N,N-dimethylacetamide, hexanamide, stearamide, acetone, methanol, ethanol, 1-propanol, 2-propanol, butanol, ethylene glycol, polyethylene glycols, ethyl acetate, ethyl benzoate, benzene, o-dichlorobenzene, toluene, dimethylsulfoxide, pyridine, tetrahydrofuran, dioxane, and mixtures of these solvents in various proportions as may be required to attain solution of the leuco dye and the triacylhydroxylamine selected for use in the photosensitive composition.

In addition to a residual amount of a solvent, a polymeric binder or matrix may be present in the present novel light-sensitive composition spread over or contained in a substrate. A binder which may optionally be added to the composition is an inert material that serves to adhere the photosensitive mixture to the substrate. The binder may also serve to thicken the solution of the composition should this be desirable for specific applications. The light-sensitive composition may also be mixed with a polymeric material which can serve as a matrix for the photosensitive composition and the mixture may be cast, extruded or otherwise formed into unsupported films. These films may then be used for image formation as are the substrates bearing the light-sensitive mixture of leuco dye and triacylhydroxylamine. Examples of binders and matrices that will be found applicable are ethyl cellulose, polyvinyl alcohol, polyvinyl chloride, polystyrene, polyvinyl acetate, poly(methyl methacrylate), cellulose acetate, cellulose nitrate, chlorinated rubber, copolymers of vinyl monomers, gelatin. A binder or matrix will be used in an amount varying from about 0.5 part to about 200 parts by weight per part of combined weight of leuco dye and triacylhydroxylamine. Amounts within the range of about 0.5 part to 10 parts will be used when the polymer functions as an adhesive or thickener, while higher amounts will be used when the polymer forms an unsupported film containing the photosensitive composition. With certain polymer matrices, the addition of a plasticizer may be desirable to give flexibility to the film or coating containing the photosensitive composition.

The substrates are materials to which the light-sensitive, image-forming compositions of this invention may be applied as a coating or impregnant. They are materials commonly used in the graphic arts and in decorative and protective applications. These materials include paper varying in type from tissue paper to heavy cardboard; films of plastics and polymeric materials such as regenerated cellulose, cellulose acetate, cellulose nitrate, polyesters of glycol and terephthalic acid, polyethylene, polyvinyl acetate, poly(methyl methacrylate) and the like; textile fabrics; glass; wood and metals.

The compositions of this invention may be prepared from a solution of the leuco dye ranging in concentration from about 0.5% by weight to the limit of its solubility in the selected solvent or solvent mixture and to add to this solution a triacylhydroxylamine in an amount about equivalent on a molar basis to the leuco dye. Optionally, a binder as described above may be added to the solution. The selection of the leuco dye will depend upon the color and quality of the image desired. Two or more leuco dyes may be used in combination to obtain a particular color or shade of color or to provide a neutral gray or black coloration in the image.

In applying a solution of the photosensitive composition to paper, films, fabrics, or to the surfaces of rigid substrates such as glass, wood, plastics, or metals the solution may be sprayed, brushed, applied by a roller or an immersion coater, flowed over the surface, picked up by immersion, or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 mg./sq. in. to about 5.0 mg./sq. in. of leuco dye and the equivalent amount of triacylhydroxylamine electron acceptor. Images of greater and lesser intensity of color are provided by the application of greater and lesser amounts of leuco dye to the substrate.

The substrates bearing the solution of the leuco dye and triacylhydroxylamine, and optionally a binder, may be dried simply at room temperature. They also may be dried under vacuum at room temperature or at elevated temperatures. The upper temperature limit is critical in combination with exposure time. A short exposure to heat of 90° C. may not be detectably harmful, while several hours' exposure to this heat may reduce the light sensitivity of the composition.

The leuco dye and the N,N,O-triacylhydroxylamine of the invention may be mixed in mole ratios within the range from about 10:1 (leuco dye:triacylhydroxylamine) to about 1:10. The preferred range depends upon the light absorption characteristics of these substances. Thus, should the triacylhydroxylamine and the leuco dye absorb light of essentially the same wavelengths, the triacylhydroxylamine would screen the leuco dye so that a high ratio of the components (i.e., a relatively higher quantity of leuco dye) is needed to give adequate color intensity. Preferred embodiments of leuco dyes and triacylhydroxylamines are those with which little or no overlap of light absorption occurs. For these combinations, the preferred range is 2:1 to 1:2 with the preferred ratio being about 1:1.

Any convenient source of ultraviolet light of wavelength that is absorbed in part by the leuco dye of the photosensitive composition of the invention may be used to activate the composition and induce formation of an image. Among the light sources which have been employed are a sun lamp, an electronic flash gun, a germicidal lamp, ultraviolet lamps providing specifically light of short wavelength (2537 A.) and lamps providing light of long wavelength (3663 A.). The light exposure time will vary from a fraction of a second to several minutes depending upon the intensity of the light, its distance from the light-sensitive composition, the nature and amount of the light-sensitive composition, and the intensity of a color in the image desired. In general, light sources that emit radiation in the region between about 2000 A. and 4200 A. are useful in producing color in solutions of the leuco dye-triacylhydroxylamine compositions and images with these compositions on numerous substrates.

Images may be formed by a beam of light or by exposure to light of a selected area behind a negative, a stencil, or relatively opaque pattern. The negative may be one formed by a silver halide photographic process. The negative may also be one in which the opacity results from aggregations of areas of different refractive index. Image formation may also be effected in conventional diazo printing apparatus.

The novel light-sensitive compositions of this invention have significant utility in a variety of applications. Among these are:

(1) *Printing applications.*—Very soft paper, as for example tissue paper, can be easily imaged when it has been treated with subject photosensitive composition, by projecting an image onto the treated surface.

(2) *Radiation dosimeters.*—Paper or plastic films may be impregnated or coated with the subject photosensitive compositions and these may be used to determine the quantity of solar radiation that falls on a particular surface.

(3) *Layout for metal working.*—The photosensitive composition may be applied to a metal surface when suitably formulated as a paint or lacquer. The metal surface may then be marked by irradiation through a suitable template to produce an image. The image may correspond to holes which are to be drilled or other operations of metal working and manufacture. This technique is particularly valuable when the metal to be marked has an irregular shape.

(4) *Blueprints.*—When applied to paper or plastic films, the light-sensitive compositions of this invention can find application in diazo printout equipment.

Representative examples further illustrating the present invention follow:

EXAMPLE 1

In one part of a 50:50 by volume solution of ethanol and N,N-dimethylformamide is dissolved 0.005 part of N,N,O-triacetylhydroxylamine and 0.005 part of tris(4-diethylamino-o-tolyl)methane zinc chloride-hydrochloride salt. A portion of the resultant pale pink solution is used to saturate a piece of filter paper, and the paper is dried in air at room temperature in the dark. A section of the paper is exposed to light from a 275-watt sun lamp at a distance of 4 inches for 10 seconds. The exposed area of the paper develops an intense blue color, while the unirradiated part remains colorless. Paper similarly impregnated with the leuco dye alone, i.e., not mixed with the triacetylhydroxylamine, remains essentially unchanged under these exposure conditions.

The same intense blue color develops in other portions of the paper bearing the leuco dye and N,N,O-triacetylhydroxylamine upon exposure for about 2 milliseconds to the light from a xenon flash tube having a light output of 5000 candle power seconds. Also, the blue color is obtained when the treated paper is exposed for 20 seconds to the light of ultraviolet lamps fitted with filters to allow transmission of light essentially at wavelengths of 2537 A. and 3660 A., respectively.

A portion of the solution containing the leuco dye and N,N,O-triacetylhydroxylamine is placed under the sun lamp. In 5 seconds a pale blue color appears. In one minute the color is dark blue produced by the formation of tris(4-diethylamino-o-tolyl)methane dye which is identified by its absorption spectrum. In the absence of the N,N,O-triacetylhydroxylamine no photooxidation of the leuco dye solution, as indicated by the absence of the blue color, occurs on exposure to the sun lamp for 5 seconds. After one minute of exposure, the leuco dye solution develops a trace of pink-violet color.

By the above procedure, solutions of N,N,O-triacetylhydroxylamine with tris(p-diethylaminophenyl)methane, tris(4-diethylamino-o-tolyl)methane, and p-(1,2,2-tricyanoethyl)-N,N-dimethylaniline, respectively, in place of tris(4-diethylamino-o-tolyl)methane zinc chloride-hydrochloride salt employed to impregnate filter paper produce intense colors upon irradiation with ultraviolet light from the various sources. The colors result from the photooxidation of the leuco dyes to the dyes themselves by the N,N,O-triacetylhydroxylamine under the action of the ultraviolet light.

EXAMPLE 2

The following solutions are prepared:

(A) 0.0422 g. ($2.05 \times 10^{-4}$ mole) of N-acetoxyphthalimide in 20 ml. N,N-dimethylformamide, (B) 0.125 g. ($2.05 \times 10^{-4}$ mole) of tris(4-diethylamino-o-tolyl)methane trihydrochloride in 20 ml. N,N-dimethylformamide, (C) 0.125 g. ($2.05 \times 10^{-4}$ mole) of tris(4-dimethylamino-o-tolyl)methane trihydrochloride and 0.0422 g. ($2.05 \times 10^{-4}$ mole) of N-acetoxyphthalimide in 20 ml. N,N-dimethylformamide.

The absorption spectra of a sample of each solution contained in a 1 cm. quartz cell is determined. Each solution is then irradiated with light from three flashes of a xenon flash tube positioned 1.5 inches from the solution. Each flash is a result of a 200 watt-second input and has a duration of 0.002 second. After the irradiation, the absorption spectra of the three solutions are redetermined.

Solution A, which was initially colorless, shows no change either in its appearance or absorption spectrum. Solution B, which initially had a pale pink color, a single absorbance peak of 0.16 absorbance unit at 520 m$\mu$ changes to a pale pink-violet color with essentially the same absorbance peak at 520 mμ and with a new weak absorbance peak of 0.15 unit at 625 mμ. Solution C, which initially had essentially the same pale pink color and absorption spectrum prior to irradiation as Solution B, changes on irradiation to a blue color with absorbance at 520 mμ unchanged from that of the solution before irradiation and an absorbance peak of 0.56 unit at 625 mμ. This absorbance at 625 mμ is the absorbance maximum for tris(4-diethylamino-o-tolyl)methane dye.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specification embodiments thereof.

The embodiments of the invention in which an exclusive property or privilege is claimed are defined as follows:

1. A light-sensitive composition comprising an intimate admixture of (1) the leuco form of a dye having one or two removable hydrogen atoms, the removal of which forms a differently colored compound, and (2) an N,N,O-triacylhydroxylamine wherein the N,N-acyl groups may form with the nitrogen atom an imide ring, with the proviso that the N,N,O-triacylhydroxylamine and said leuco dye produce color when about 10 mg. of each of these compounds are mixed together in 10 ml. of a 50:50 mixture of ethanol and N,N-dimethylformamide in a quartz vessel and irradiated with light of a wavelength from about 2000 A. to about 4200 A.

2. The composition of claim 1 wherein the leuco form of the dye of component (1) is selected from the class consisting of an aminotriarylmethane, an aminoxanthene, an aminothioxanthene, an amino-9,10-dihydro-acridine, an aminophenoxazine, an aminophenothiazine, an aminodihydrophenazine, an aminodiphenylmethane, an aminohydrocinnamic acid, a leuco-indigoid dye, a 1,4-diamino-2,3-dihydroanthraquinone, a 1,4-bis(4,5-diaryl-2-imidazolyl)benzene, and a hydroxyphenyldiarylimidazole.

3. The composition of claim 1 wherein the leuco form of the dye of component (1) is selected from the class consisting of
 (a) an aminotriarylmethane containing at least two p-dialkylaminosubstituted phenyl groups having as a substituent ortho to the methane carbon an alkyl, alkoxy or halogen,
 (b) salts thereof formed with mineral acids,
 (c) salts thereof formed with organic acids, and
 (d) salts thereof formed with an acid-supplying compound.

4. A composition according to claim 1 wherein said leuco dye is selected from the group consisting of tris(4-diethylamino-o-tolyl)methane, salts thereof formed with mineral acids, salts thereof formed with organic acids, and salts thereof formed with an acid-supplying compound; and, said N,N,O-triacylhydroxylamine is N,N,O-triacetylhydroxylamine.

5. A light-sensitive product consisting essentially of a supporting base carrying a light-sensitive composition according to claim 1.

6. Paper treated with a light-sensitive composition as defined in claim 1.

7. A process for forming a colored material wherein a light-sensitive composition as defined in claim 1 is irradiated with light having a wavelength from about 2000 A. to about 4200 A.

References Cited

UNITED STATES PATENTS 3,284,205  11/1966  Sprague et al. _____ 96—90

OTHER REFERENCES

Carroll, B. H.: "The Photochemical Oxidation of Leuco-Bases," J. Physical Chemistry, vol. 30, No. 1, pp. 130–133 (1926).

NORMAN G. TORCHIN, *Primary Examiner.*

C. E. DAVIS, *Assistant Examiner.*